Figure 1:
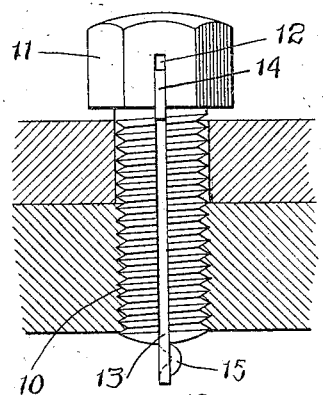

H. MEREDITH-JONES.
LOCKING SCREW.
APPLICATION FILED MAR. 24, 1913.

1,082,891.

Patented Dec. 30, 1913.

WITNESSES:
H. W. Meade
S. W. Atherton

INVENTOR
Hubert Meredith-Jones
BY
J. M. Wooster
ATTORNEY

UNITED STATES PATENT OFFICE.

HUBERT MEREDITH-JONES, OF NEW YORK, N. Y.

LOCKING SCREW.

1,082,891.  Specification of Letters Patent.  Patented Dec. 30, 1913.

Application filed March 24, 1913. Serial No. 756,308.

*To all whom it may concern:*

Be it known that I, HUBERT MEREDITH-JONES, a subject of the King of Great Britain, residing at New York, county of New York, State of New York, have invented an Improvement in Locking Screws, (Case A,) of which the following is a specification.

This invention relates more especially to cap screws, that is screws having heads which are adapted to be turned into engagement with the work, and has for its object to provide the screws with simple and inexpensive means for locking them rigidly against jarring loose or coming out.

With this end in view I have devised the simple and novel locking screw which I will now describe, referring to the accompanying drawing forming a part of this specification and using reference characters to indicate the several parts.

Figure 2:
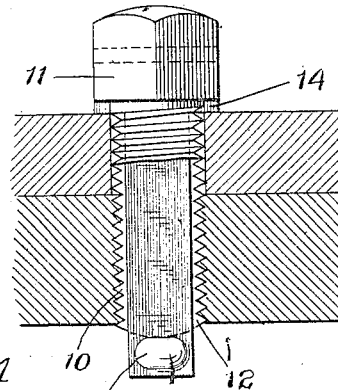
Figure 3:
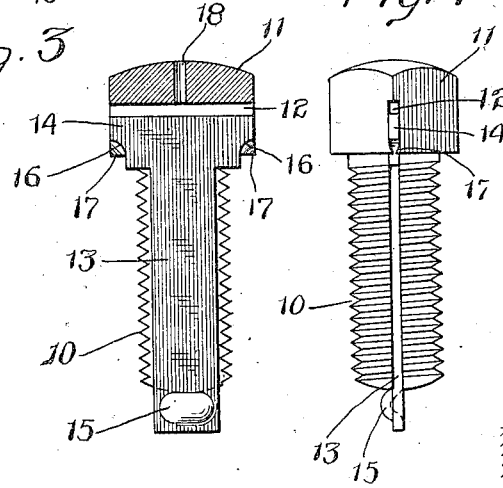
Figure 4:
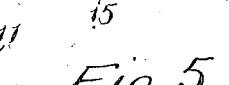

Figure 1 is a view partly in elevation and partly in section illustrating the construction and operation of my novel screw, the slot being shown as extending across the flats of the head; Fig. 2 a similar view at right angles to Fig. 1; Fig. 3 a sectional view of the screw detached, the slot in the head being across corners and the locking plate being retained against detachment; Fig. 4 an elevation at right angles to Fig. 3, and Fig. 5 is a view showing the application of the invention to a double threaded screw or stud.

The invention consists in providing the screw with a longitudinal slot extending from the end of the threaded shank partway through the head and providing in said slot a locking plate having a head of greater width than the thread and provided with a bump or enlargement below the point of the screw which is drawn into the slot when the screw is turned in and expands the end causing the threads of the screw to engage the threads of the hole and rigidly lock the screw against movement. The locking plate may or may not be detachable from the screw.

10 denotes the threaded shank of the screw and 11 the head. The screw is provided with a longitudinal slot 12 which extends the entire length of the shank and well into the head, as shown. Within this slot is a locking plate 13 which is of less width than the diameter of the screw and is provided with a head 14 of greater width than the threads so as to bear upon the work outside the hole in the work and under the head of the screw. The slot in the head of the screw may be made across flats as in Figs. 1 and 2 or across corners as in Figs. 3 and 4. In the form illustrated in Fig. 5, in which the invention is shown as applied to a double threaded screw or stud, the head is ordinarily round, as shown. The shank of the locking plate in all the forms is made longer than the shank of the screw and is provided with a bump or enlargement 15 below the end of the screw for a purpose presently to be explained.

Figure 5:
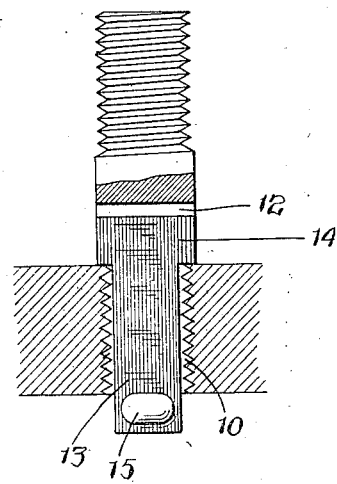

In Figs. 1, 2 and 5, the locking plate is shown as detachable from the screw. Should it be preferred, however, to furnish the screws with locking plates in place and not readily detachable therefrom, I provide the underside of the heads of the locking plates with recesses 16 and upset the metal of the screw heads, at the ends of the slots, into the recesses in the heads of the locking plates as at 17 in Figs. 3 and 4, which prevents the locking plate from dropping out from the slot.

The operation is as follows: Each screw is provided with a locking plate, either detachable or not as preferred, and is turned to place in the usual manner. As the screw is turned in, the head of the locking plate engages the surface of the work contiguous to the hole and can of course move inward no farther. The effect of turning the screw farther is to force the slotted end of the shank of the screw over the bump or enlargement which expands the point of the screw and causes the threads of the screw to engage the threads of the work and rigidly lock the screw against loosening and against the possibility of its working out. It will be noted that the slot in the head of the screw is made considerably deeper than the height of the head of the locking plate. This is in order to permit the head of the screw to be turned down tight upon the work and to permit ample movement in the slot of the head of the locking plate. To remove my novel locking screw, sufficient power is applied to the head of the screw to turn it outward slightly, then the head of the locking plate is struck a blow by means of a suitable tool to start the locking plate downward and disengage the bump from the slot, after which the screw may be turned out in the usual manner, the sides of the shank of the screw closing in upon the locking plate above the bump as the screw is turned outward.

In Fig. 3 I have shown the head of the screw as provided with a hole 18 leading from the top into the slot through which a nail or tool may be inserted to start the locking plate downward when it is desired to remove the screw. In the other forms, the tool is applied at the ends of the slot, the upsetting of the metal at 17 being just sufficient to retain the locking plate in the screw in transportation and handling and not acting to hold the locking plate against a blow.

Having thus described my invention I claim:

1. A locking screw having a slot extending the length of the shank and into the head and a locking plate in said slot having a head wider than the shank of the screw and a bump or projection below the end of the screw shank whereby the end of the screw is expanded, thereby bringing the threads of the screw into close engagement with the threads of the work by continued inward movement of the screw after the head of the locking plate has engaged the work.

2. A locking screw having a slot extending the length of the shank and into the head, and a locking plate in said slot having a shank of less width than the diameter of the screw and a head of greater width than the diameter of the screw so as to bear upon the work and a bump or projection below the end of the screw which is adapted to be drawn into the slot to expand the point of the screw when the head of the screw engages the work.

3. A locking screw having a slot extending the length of the shank and into the head and a locking plate in said slot having a head wider than the shank of the screw and a bump or projection below the end of the screw shank and means for retaining the locking plate in engagement with the screw.

4. A locking screw having a slot extending the length of the shank and into the head and a locking plate in said slot having a head wider than the shank of the screw and a bump or projection below the end of the screw shank, the head of the locking plate being provided with recesses and the metal at the ends of the slots being upset into said recesses to retain the locking plate in engagement with the screw.

5. A locking screw having a slot extending the length of the shank and into the head and a locking plate in said slot having a head wider than the shank of the screw and a bump or projection below the end of the screw shank, means for retaining the locking plate in engagement with the screw and said screw having a hole in the head leading into the slot, for the purpose set forth.

6. A locking screw having a slot extending the length of the shank and into the head, and a locking plate in said slot having a head wider than the shank of the screw and a bump or projection below the end of the screw, the slot in the head of the screw being deeper than the height of the head of the locking plate, means for retaining the locking plate in engagement with the screw, and said screw having a hole in the head leading into the slot.

In testimony whereof I affix my signature in presence of two witnesses.

HUBERT MEREDITH-JONES.

Witnesses:
L. ANDER,
E. H. WOSISKI.